United States Patent [19]

Werber et al.

[11] Patent Number: 5,228,489
[45] Date of Patent: Jul. 20, 1993

[54] ROUTER TOOL

[76] Inventors: George P. Werber, 28 Banbury Dr., Westford, Mass. 01886; James Denaro, 543 Bedford St., Concord, Mass. 01742

[21] Appl. No.: 950,557
[22] Filed: Sep. 25, 1992
[51] Int. Cl.$^5$ .......................... B27G 13/12; B27C 5/10
[52] U.S. Cl. ............................... 144/218; 144/1 F; 144/134 D; 144/371; 408/241 S; 409/182; 409/184
[58] Field of Search .................. 409/182, 184; 144/134 R, 134 D, 136 C, 150, 144 R, 241, 371, 1 F; 408/241 R, 241 S

[56] References Cited

U.S. PATENT DOCUMENTS

| 2,396,584 | 3/1946 | Liff | 409/184 |
| 2,795,249 | 6/1957 | Zern | 144/134 D |
| 2,872,731 | 2/1959 | Greenwood | 144/134 S |

Primary Examiner—W. Donald Bray
Attorney, Agent, or Firm—John E. Toupal; Harold G. Jarcho

[57] ABSTRACT

A tool including a shaft having a drive portion, a lateral stop portion, and an intermediate portion straddled by the drive and lateral stop portions, the drive portion being adapted for detachable engagement with a rotary drive; a router blade mechanism retained by the intermediate portion of the shaft and projecting radially outwardly therefrom; a first coupling keying rotation of the shaft to the router blade mechanism so as to form a rotatably engaged unit; a longitudinal stop defining a bearing surface projecting radially outwardly from the router blade mechanism; and a second coupling securing the longitudinal stop to the unit and permitting axial adjustment between the router blade mechanism and the bearing surface.

20 Claims, 1 Drawing Sheet

U.S. Patent     July 20, 1993     5,228,489
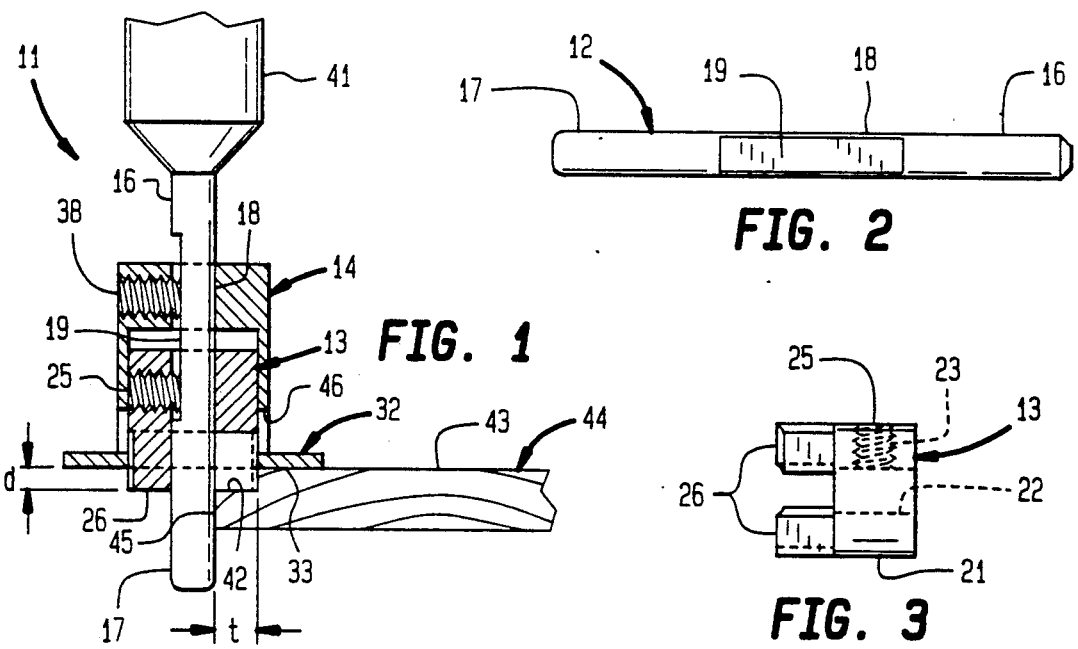
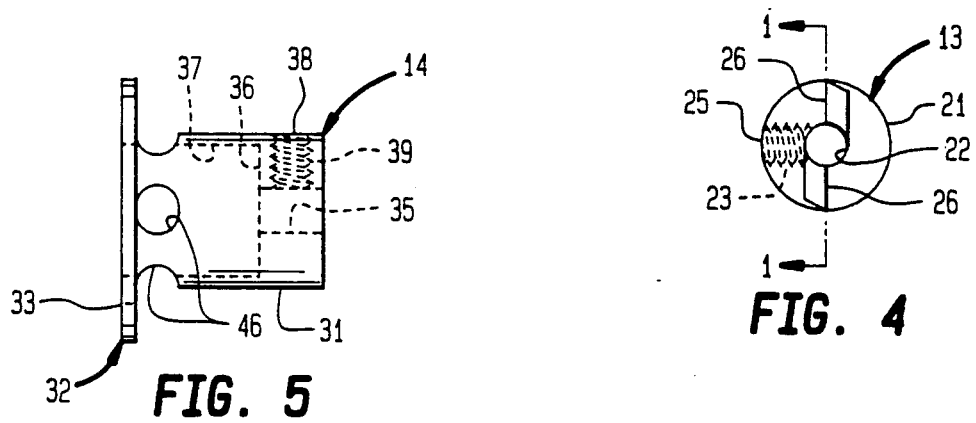
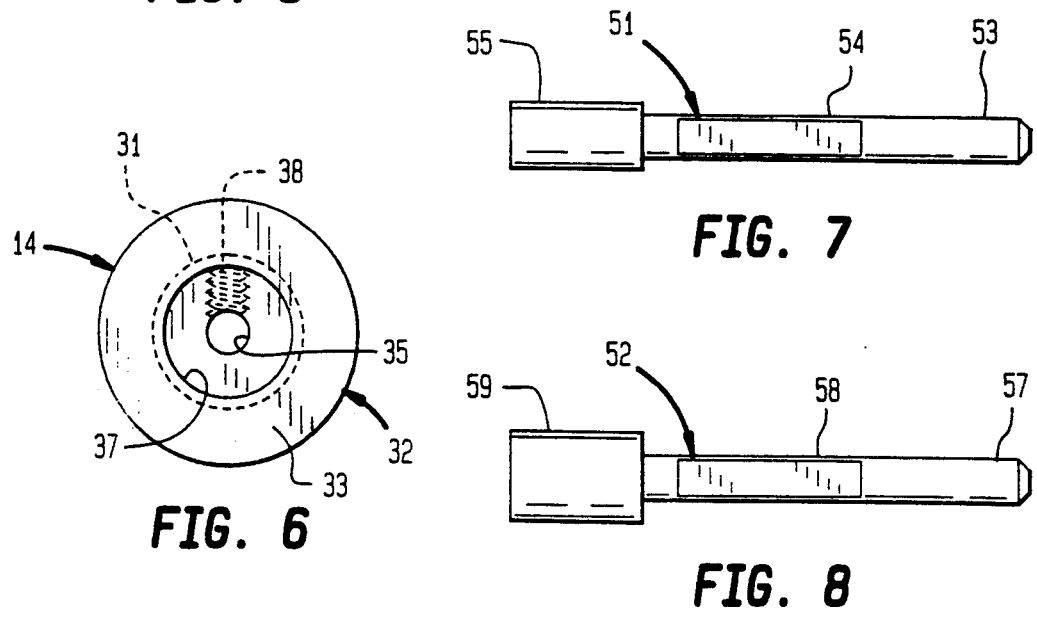

ROUTER TOOL

BACKGROUND OF THE INVENTION

This invention relates generally to a router tool and, more particularly, to a router tool for use with conventional rotary drive devices.

Routers are used extensively to cut patterns into wood and metal substrates. However, conventional router tools are not suitable for use in work applications requiring the creation in workpieces of relatively minute grooves of varying dimension. Furthermore, existing motor driven router tools are unduly cumbersome and expensive for certain applications.

The object of this invention, therefore, is to provide a relatively inexpensive router tool that can be used to cut rabbets and grooves of varying dimension in either wood or metal workpieces.

SUMMARY OF THE INVENTION

The invention is a tool including a shaft having a drive portion, a lateral stop portion, and an intermediate portion straddled by the drive and lateral stop portions, the drive portion being adapted for detachable engagement with a rotary drive; a router blade mechanism retained by the intermediate portion of the shaft and projecting radially outwardly therefrom; a first coupling keying rotation of the shaft to the router blade mechanism so as to form a rotatably engaged unit; a longitudinal stop defining a bearing surface projecting radially outwardly from the router blade mechanism; and a second coupling securing the longitudinal stop to the unit and permitting axial adjustment between the router blade mechanism and the bearing surface. In combination with a conventional rotary drive such as a portable drill, the tool can be used to cut rabbets and grooves of selective depth in a suitable workpiece.

According to one feature of the invention, the second coupling keys the longitudinal stop to the router blade mechanism. Keying the stop for rotation with the blade mechanism provides more table cutting operations.

According to another feature of the invention, the bearing surface is an annular planar surface surrounding the router blade mechanism and facing the lateral stop portion. Smooth cutting operation is enhanced by the provision of an annular, planar bearing surface.

According to yet other features of the invention, the longitudinal stop includes a hollow cylinder surrounding the intermediate portion and keyed by the second coupling to the router blade mechanism, and the bearing surface is defined by an annular collar projecting radially outwardly from one end of the hollow cylinder. The arrangement provides desired operation with a compact, easily manufactured configuration.

According to still another feature of the invention, the hollow cylinder defines a plurality of apertures disposed adjacent to the annular collar. The apertures facilitate the discharge of debris to prevent clogging during cutting operations.

According to further features of the invention, the first and second couplings are set screws. The desired coupling functions are efficiently provided by the set screws.

In a preferred embodiment, the tool includes a plurality of interchangeable shafts each having a lateral stop portion with a diameter different than those of the other lateral stop portions. Grooves of desired width can be cut by appropriate selection of one of the plurality of shafts.

DESCRIPTION OF THE DRAWINGS

These and other objects and features of the invention will become more apparent upon a perusal of the following description taken in conjunction with the accompanying drawings wherein:

FIG. 1 is a longitudinal cross sectional view of a router tool according to the invention;

FIG. 2 is a side view of a shaft utilized in the tool of FIG. 1;

FIG. 3 is a side view of a blade assembly utilized in the tool of FIG. 1;

FIG. 4 is an end view of the assembly shown in FIG. 3;

FIG. 5 is a side view of a stop assembly utilized in the tool of FIG. 1;

FIG. 6 is an end view of the stop assembly shown in FIG. 5;

FIG. 7 is a side view of another shaft embodiment of the invention; and

FIG. 8 is a side view of still another shaft embodiment of the invention.

DESCRIPTION OF THE PREFERRED EMBODIMENT

A router tool 11 includes a shaft 12, a router blade assembly 13, and a longitudinal stop assembly 14. The shaft 12 includes at one end a drive portion 16, at an opposite end a lateral stop portion 17 and an intermediate portion 18 straddled by the drive portion 16 and the stop portion 17. Defined in the intermediate portion 18 and extended longitudinally thereon is a flat portion 19.

The router blade assembly 13 has a body portion 21 with a central bore 22 for receiving the intermediate portion 18 of the shaft 12. Extending radially between an outer surface of the body portion 21 and the central bore 22 is a threaded opening 23. A first set screw coupling 25 is received by the threaded opening 23. Extending longitudinally from the body portion 21 are a pair of circumferentially spaced apart router blades 26 having outer edges for cutting in directions transverse to the axis of the shaft 12.

The longitudinal stop assembly 14 includes a hollow cylindrical body portion 31 having a radially outwardly projecting collar 32. Defined by the collar 32 is an annular, planar bearing surface 33 projecting radially outwardly from the router blades 26 of the assembly 13. A central bore 35 in the body portion 32 receives the intermediate portion 18 of the shaft 12. Formed by a counterbore 36 in the body portion 31 is a cylindrical cavity 37 that accommodates the router blade assembly 13. A second set screw coupling 18 is received by a threaded opening 39 extending between an outer surface of the body portion 31 and the central bore 35.

OPERATION

Prior to use, the tool 11 is assembled in the manner illustrated in FIG. 1 with the first set screw 25 engaging the flat portion 19 so as to key the shaft 12 and router blade assembly 13 into a rotatable engaged unit. With the second set screw 38 disengaged from the flat portion 19, the longitudinal stop assembly 14 is adjusted axially on the shaft 12 to establish a desired spacing d between the bottom edges of the blades 26 and the annular bearing surface 33. That spacing then is maintained by engaging the second set screw 38 with the flat portion 19 on the shaft 12 to key the stop assembly 14 to the unit formed by the shaft 12 and router blade assembly 13.

After insertion of the drive portion 16 of the shaft 12 into a chuck 41 of a conventional rotary drive such as a portable hand drill, the tool 11 can be used to cut a peripheral rabbet 42 in the surface 43 of a workpiece 44 (FIG. 1). A uniform width t is established for the rabbet 42 by the lateral stop portion 17 that is maintained in engagement with a peripheral edge 45 of the workpiece 44. In addition, the desired depth d for the rabbet 42 is established by the annular bearing surface 33 that is maintained in engagement with the upper surface 43 of the workpiece 44. Material cut from the workpiece 44 during formation of the rabbet 42 is discharged through circumferentially spaced apart apertures 46 formed in the hollow cylinder 31 adjacent to the collar 32. That discharge and operational stability are enhanced by keying the longitudinal stop assembly 14 for rotation with the shaft 12. Preferably, an aperture 46 is aligned with each blade 26.

FIGS. 7 and 8 illustrate other shafts 51, 52 for use in the tool 11. The shaft 51 includes a driven portion 53 and an intermediate portion 54 identical to, respectively, the drive portion 16 and the intermediate portion 18 of the shaft 12 shown in FIG. 2. However, a lateral stop portion 55 of the shaft has a diameter greater than the diameter of the stop portion 17 of the shaft 12. Similarly, the shaft 52 includes a drive portion 57 and an intermediate portion 58 identical to, respectively, the drive portion 16 and the intermediate portion 18 of the shaft 17. However, a lateral stop portion 59 of the shaft 52 has a diameter greater than the diameter of the stop portion 55 of the shaft 51.

The shafts 51 and 52 are used interchangeably with the tool 11 in the same manner as described above for the shaft 12. However, with the shaft 51 substituted for the shaft 12, a recess is formed with the tool 11 having a uniform width less than t. Similarly, with the shaft 52 inserted into the tool 11, a recess is formed having a uniform width less than the recess widths formed by either the stop portion 17 or the stop portion 55. By selective use of the shafts 12, 51 and 52, the tool 11 can be used to form recesses with predetermined desired widths.

Obviously, many modifications and variations of the present invention are possible in light of the above teachings. For example, the stop assembly 14 can function without being keyed for rotation with the shaft 12. It is to be understood, therefore, that the invention can be practiced otherwise than as specifically described.

What is claimed is:

1. A tool comprising:
    portion, a lateral stop portion, a shaft having a drive and an intermediate portion straddled by said drive and lateral stop portions, said drive portion adapted for detachable engagement with a rotary drive;
    router blade means retained by said intermediate portion of said shaft and projecting radially outwardly therefrom;
    first coupling means keying rotation of said shaft to said router blade means so as to form a rotatably engaged unit;
    longitudinal stop means defining a bearing surface projecting radially outwardly from said router blade means; and
    second coupling means coupling said longitudinal stop means to said unit and permitting axial adjustment between said router blade means and said bearing surface.

2. A tool according to claim 1 wherein said second coupling means keys said longitudinal stop means to said router blade means.

3. A tool according to claim 2 wherein said bearing surface is an annular planar surface surrounding said router blade means and facing said lateral stop portion.

4. A tool according to claim 3 wherein said longitudinal stop means includes a hollow cylinder surrounding said intermediate portion and keyed by said second coupling means to said router blade means.

5. A tool according to claim 4 wherein said bearing surface is defined by an annular collar projecting radially outwardly from one end of said hollow cylinder.

6. A tool according to claim 5 wherein said hollow cylinder defines a plurality of apertures disposed adjacent to said annular collar.

7. A tool according to claim 6 wherein said router blade means includes a body portion and a plurality of router blades projecting longitudinally therefrom, said hollow cylinder is keyed to said body portion, and one of said apertures is aligned with each of said blades.

8. A tool according to claim 7 wherein said first and second coupling means are set screws.

9. A tool according to claim 1 wherein said bearing surface is an annular planar surface surrounding said router blade means and facing said lateral stop portion.

10. A tool comprising:
    a plurality of shafts each having a drive portion, a lateral stop portion, and an intermediate portion straddled by said drive and stop portions; and wherein said drive portions are adapted for detachable engagement with a rotary drive, and the diameter of each lateral stop portion is different than the diameter of each other said lateral stop portion;
    router blade means for retaining said intermediate portion of a selected one of said shafts, said intermediate portion projecting radially outwardly from said router blade means;
    first coupling means keying rotation of said selected shaft to said router blade means so as to form a rotatably engaged unit;
    longitudinal stop means defining a bearing surface projecting radially outwardly from said router blade means; and
    second coupling means coupling said longitudinal stop means to said unit and permitting axial adjustment between said router blade means and said bearing surface.

11. A tool according to claim 10 wherein said second coupling means keys said longitudinal stop means to said router blade means.

12. A tool according to claim 11 wherein said bearing surface is an annular planar surface surrounding said router blade and facing said lateral stop portion.

13. A tool according to claim 12 wherein said longitudinal stop means includes a hollow cylinder surrounding said intermediate portion and keyed by said second coupling means to said router blade means.

14. A tool according to claim 13 wherein said bearing surface is defined by an annular collar projecting radially outwardly from one end of said hollow cylinder.

15. A tool according to claim 14 wherein said hollow cylinder defines a plurality of apertures disposed adjacent to said annular collar.

16. A tool according to claim 15 wherein said router blade means includes a body portion and a plurality of router blades projecting longitudinally therefrom, and said hollow cylinder is keyed to said body portion.

17. A tool according to claim 16 wherein said first and second coupling means are set screws.

18. A tool according to claim 10 wherein said bearing surface is an annular planar surface surrounding said router blade and facing said lateral stop portion.

19. A tool according to claim 18 wherein said longitudinal stop means includes a hollow cylinder surrounding said intermediate portion and keyed by said second coupling means to said router blade means.

20. A tool according to claim 19 wherein said bearing surface is defined by an annular collar projecting radially outwardly from one end of said hollow cylinder.

* * * * *